Feb. 14, 1967    G. R. GODFREY ETAL    3,303,860
VALVES FOR CYLINDERS OF PRESSURISED FLUIDS
Filed May 8, 1964
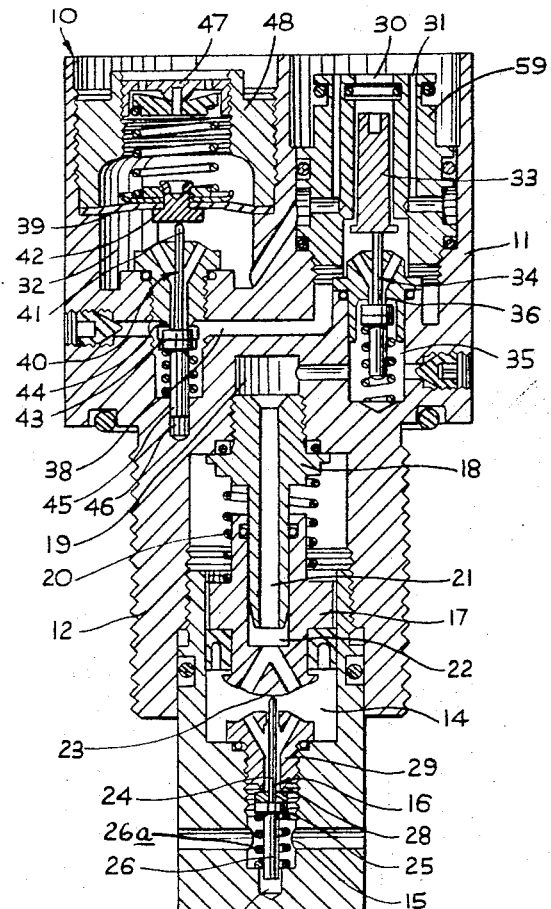
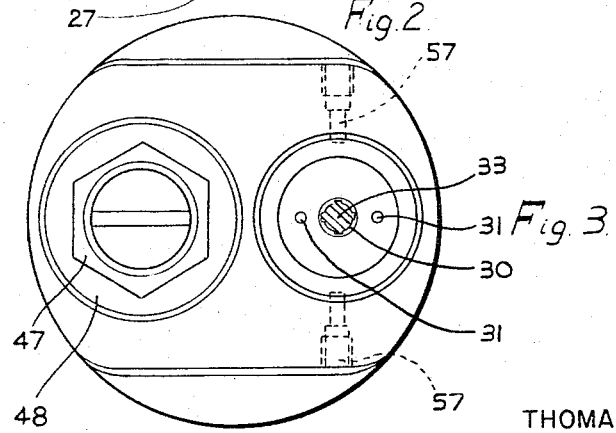
INVENTORS
THOMAS RONALD YATES
ROGER JAMES LANGSTONE
GORDON REGINALD GODFREY
BY
ATTORNEYS

United States Patent Office 3,303,860
Patented Feb. 14, 1967

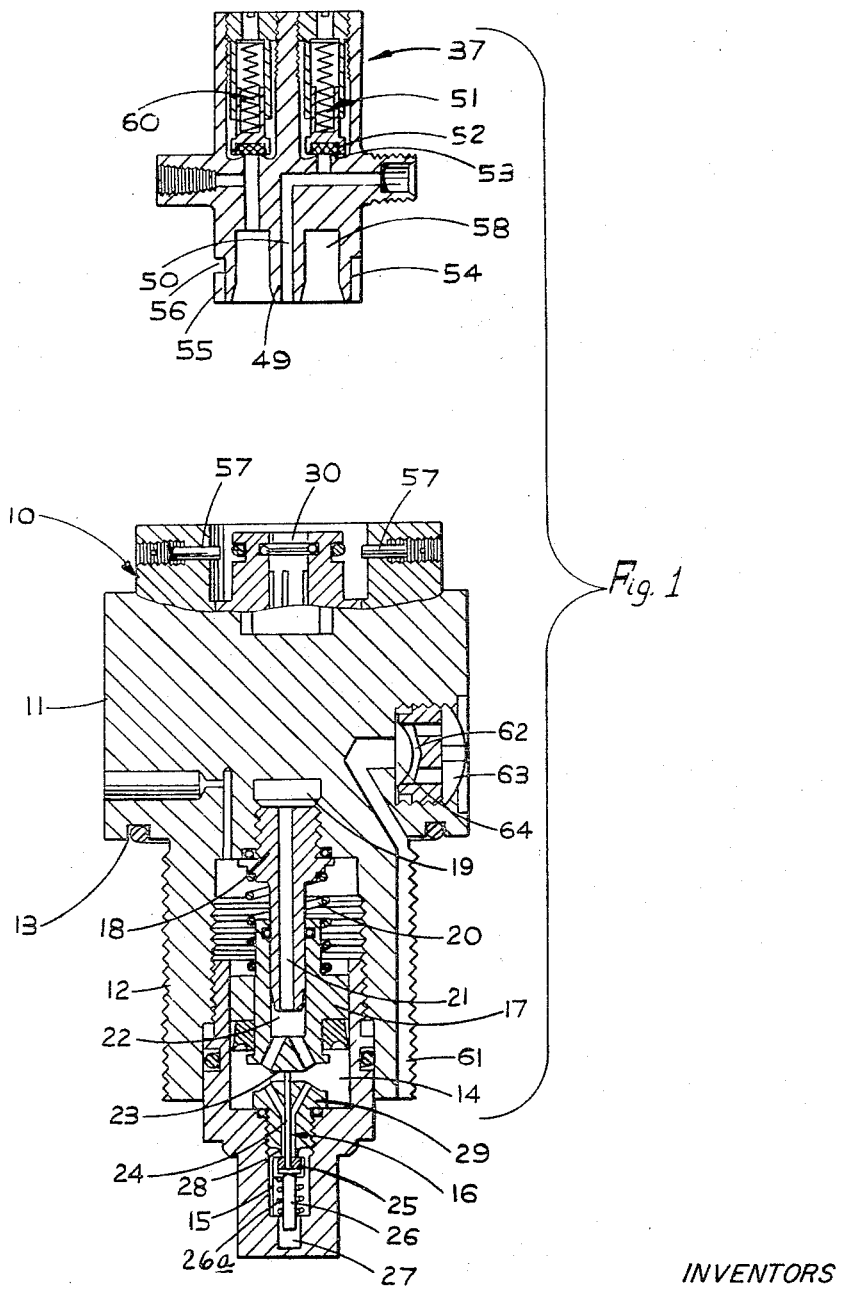

3,303,860
VALVES FOR CYLINDERS OF PRESSURISED FLUIDS
Gordon Reginald Godfrey, Carshalton, Roger James Langstone, Solihull, and Thomas Ronald Yates, Birmingham, England, assignors to Messenger & Sons (Birmingham) Limited, Birmingham, England, a British company
Filed May 8, 1964, Ser. No. 365,967
Claims priority, application Great Britain, Mar. 11, 1964, 10,229/64
9 Claims. (Cl. 141—21)

This invention relates to valves for cylinders of pressurised fluids of the kind in which the body of the cylinder valve includes a pressure-reducing mechanism which controls the pressure of gas supplied from the cylinder via an outlet in the body of the cylinder valve to an appliance and an object of the present invention is to provide a new or improved form of such a cylinder valve.

It is a further object of the present invention to provide a cylinder valve including means for effecting a two-stage pressure reduction and in which gas can be passed to an appliance either after having been subjected to one stage of pressure reduction or after having been subjected to two stages of pressure reduction.

It is a further object of the invention to provide a two-stage pressure reducing valve having means whereby an outlet thereof may serve as an inlet for filling the cylinder.

The invention will now be described by way of example with reference to the accompanying drawings in which:

FIGURE 1 is a sectional view of a cylinder valve and bayonet connector,

FIGURE 2 is a sectional view of the cylinder valve at right angles to FIGURE 1, and FIGURE 3 is a plan view of the cylinder valve.

The cylinder valve shown in FIGURES 1 to 3 is adapted to be used in conjunction with beer dispensing apparatus. The cylinder valve 10 is of generally cylindrical shape and includes a portion 11 of increased diameter and a portion 12 of reduced diameter, the two portions being separated by a shoulder 13 and the portion of reduced diameter being externally screw-threaded.

In the end of the valve which is adapted to communicate with the interior of the cylinder (not shown) a primary chamber 14 is formed. The primary chamber 14 is adapted to communicate with the interior of the cylinder via a passage 15 in which a valve closure member 16 is disposed. A spring-loaded piston 17 is mounted in the primary chamber 14 and is adapted to reciprocate inside the primary chamber 14. Movement of the piston 17 is guided by means of a piston guide 18 which has screw-threaded engagement with a socket 19 in the valve body. A spring 20 surrounds the guide 18 and urges the piston 17 into engagement with the valve closure member 16. The piston 17 and the guide 18 are formed with through-bores 21 and 22 and a part 23 of the piston 17 adjacent the end of bore 22 provides a seating for the end of the stem 24 of the valve closure member 16. The valve closure member 16 includes a valve stem 24 and a valve head 25 which is formed continuously with a spindle 26 which is surrounded by a spring 26a and the opposite end of which engages in a socket 27 in the body of the valve. The valve seat 28 is of conical form and is constituted by a part of a guide member 29 which is formed with a throughbore through which the valve stem 24 passes, the guide member 29 is externally screw-threaded and engages in a correspondingly threaded socket in the body of the cylinder valve.

The arrangement is such that when the pressure inside the primary chamber 14 falls below a predetermined value the piston 17 moves under the action of its spring 20 so as to move the valve closure member 16 against the action of the spring 26a to an open position. In an equilibrium position the valve closure member is open. The loading of the spring 20 can be adjusted so as to vary the predetermined value mentioned above, above or below which the valve closure member 16 is moved to a closed or open position. The arrangement is also such that, when a high pressure is obtained in the primary chamber 14, the pressure of the fluid in said primary chamber will move the closure member 16 independently of the piston 17 against the action of spring 26a.

The valve is provided with co-axial outlets, a central outlet 30 which communicates with the primary chamber 14 and an outer outlet 31 which communicates with a secondary chamber 32 in the valve body. The central outlet 30 serves as a high pressure outlet and the other outlet 31 as a low pressure outlet.

The central outlet 30 includes a cylindrical passage in which a splined plunger 33 is disposed. This splined plunger 33 abuts against a further valve closure member 34 disposed inside a third chamber 35 inside the body of the valve. Valve closure member 34 is spring-urged into engagement with a conical valve seat 36 and is adapted to be moved out of engagement with the valve seat when the plunger 33 is depressed as, for example, by fitting a bayonet connector 37 to the outlets. The central outlet 30 serves also as an inlet for filling the cylinder, the splined plunger 33 being depressed on filling the cylinder, either by mechanical means not shown or because of the pressure of the gas supply used for filling the cylinder. During filling the gas flows into the third chamber 35 and thence into the primary chamber 14 and, by moving closure member 16 against the action of spring 26a, into the cylinder.

The third chamber 35 communicates with the secondary chamber 32 via a passageway 38 and a spring-loaded diaphragm 39 is disposed inside the secondary chamber. A further valve closure member 40 is disposed in the passage leading to the secondary chamber 32 and this valve closure member 40 includes a stem 41 which abuts against a yoke 42 connected to the diaphragm 39, a valve head 43 which abuts against a valve seat 44 and a valve spindle 45 one end of which is connected to the valve head 44 and the opposite end of which engages in a socket 46 in the body of the valve.

The loading of the diaphragm 39 can be adjusted manually by rotation of a spring adjustment member 47 which has screw-threaded engagement with an internally threaded threaded diaphragm retaining member 48.

When the plunger 33 in the central outlet 30 has been depressed gas passes either around the plunger to the outlet proper or to the secondary chamber 32 when the pressure inside the secondary chamber 32 falls below a predetermined value and then passes to the low pressure outlet 31. Gas can be delivered from the cylinder either through the low pressure outlet 31 or through the high pressure outlet 30 or if desired through both outlets simultaneously and the pressure of the gas supplied will depend on the settings of the pressure reducing mechanisms in the chambers 14 and 32.

The valve 10 is adapted to be connected to an appliance (not shown) by means of the bayonet connector 37 and this bayonet connector 37 includes a spigot 49 having a throughbore 50 which spigot 49 is adapted to enter the central outlet 30 and depress the plunger 33. Gas passes through the central outlet 30 around the splined plunger 33 and then through the bore 50 in the spigot 49 of the bayonet connector 37 and thence to the appliance. A spring-loaded pressure relief member 51 is contained in the bayonet connector 37 and this pressure relief member includes a spring-loaded valve head 52 which is adapted to be moved out of engagement with its seat 53 when the pressure in the supply line leading to the appliance exceeds a predetermined value. The bayonet connector 37 includes a cylindrical wall 54 which is formed with a pair of diametrically opposed external slots 55 and a circumferential groove 56. Lug screws 57 are provided in the valve body surrounding the outlets and the lug screws 57 are adapted to enter the above slots 55 and on rotation of the bayonet connector 37 to enter the circumferential groove 56 so that the bayonet connector is securely held in position. The bayonet connector 37 is formed with an annular recess 58, which surrounds the central spigot 49 and this recess 58 is adapted to house the walls 59 which surround the low pressure outlet 31 so that gas from the low pressure outlet 31 enters this annular recess 58, and then passes to an appliance, excess pressure release means 60 being provided in the path leading from the low pressure outlet to the appliance.

A trough 61 is formed in the threads of the portion 12 of reduced diameter of the valve and this trough defines a bore communicating with the interior of the cylinder when the valve is connected to the cylinder. The end of the bore is closed by a nickel diaphragm 62 which is held in position by means of a screw 63 and a washer 64 and which is adapted to rupture in the event that the pressure inside the cylinder should exceed a predetermined "safety" value.

What we then claim is:

1. The combination of a cylinder valve comprising a main valve body having means whereby it may be connected to a compressed gas cylinder, a two-stage pressure reducing mechanism within said body, means defining a high pressure outlet and a lower pressure outlet coaxial therewith, said body having a primary chamber in communication with said high pressure outlet and a secondary chamber in communication with said lower pressure outlet, and a bayonet connector with means for attachment to said valve body and including the passageways for gas from both said high pressure and lower pressure outlets to an appliance having passageways in line with the passageways of said valve body, when said appliance is attached to said connector.

2. The combination according to claim 1 in which each passageway in said bayonet connector incorporates excess pressure release means.

3. The combination of a connector and a cylinder valve, said connector having means for attaching to said cylinder valve and said cylinder valve comprising a body having means for connection to a compressed gas cylinder, a two-stage pressure reducing mechanism within said body, a first outlet for supplying gas at a relatively high pressure to an appliance, a second outlet for supplying gas at a relatively low pressure to an appliance, a primary chamber in said body in communication with said first outlet, means in said primary chamber for effecting a first stage of pressure reduction, a secondary chamber in said body in communication with said second outlet and with said primary chamber, said secondary chamber containing means for effecting a second stage of pressure reduction, means permitting the flow of high pressure fluid from the first outlet to the primary chamber and thence into the cylinder, whereby said first outlet serves as an inlet for filling said cylinder.

4. The combination of a connector and cylinder valve according to claim 3 wherein the means for affecting the first stage of said pressure-reducing mechanism includes a spring-loaded piston disposed in said primary chamber, a passageway formed in said body to permit communication between said primary chamber and the interior of said cylinder, a thoroughbore formed in said piston to permit communication between said primary chamber and said first outlet, a first valve closure member disposed in said passageway and arranged in abutting relationship with said spring-loaded piston, a first valve seat associated with said first valve closure member and spring means for urging said first valve closure member into engagement with said first valve seat such that the closure member is moved into an open position in which gas may pass from the cylinder into said primary chamber when the pressure inside said cylinder falls below a first predetermined value and such that gas may pass from said primary chamber into said cylinder when the pressure inside said primary chamber exceeds the pressure inside said cylinder by a second predetermined value.

5. The combination of a connector and cylinder valve according to claim 4 in which a second passageway interconnects said primary chamber and said first outlet and in which a second valve closure member is disposed in said second passageway, a second valve seat being associated with said second valve closure member and means being provided whereby said second valve closure member is disengaged from said second valve seat upon connection of said connector to the valve body.

6. The combination of a connector and cylinder valve according to claim 5 which includes a third passageway interconnecting said first outlet with said secondary chamber, a spring-loaded diaphragm disposed in said secondary chamber, a third valve closure member disposed in said third passageway, a third valve seat associated with said third valve closure member, a yoke connected to said diaphragm and disposed in abutting relationship with said third valve closure member and a fourth passageway interconnecting said secondary chamber and said second outlet, whereby, when the first outlet is open and the pressure in the secondary chamber falls below a predetermined value, gas passes into the secondary chamber and thence to the second outlet.

7. The combination of a connector and cylinder valve according to claim 3 in which means are provided for adjusting the pressure reductions obtained in the two stages of pressure reduction.

8. The combination of a connector and cylinder valve according to claim 6 in which means are provided for independently adjusting the pressure reductions afforded in the primary chamber and secondary chamber.

9. The combination of a connector and cylinder valve according to claim 8 in which the means for adjusting the pressure reduction afforded in the secondary chamber includes a diaphragm retaining member and a rotatable adjustment member having screw-threaded engagement with the diaphragm retaining member.

References Cited by the Examiner

UNITED STATES PATENTS

| | | | |
|---|---|---|---|
| 1,828,934 | 10/1931 | Kramer | 141—349 |
| 2,645,241 | 7/1953 | Riede | 141—349 X |
| 2,680,546 | 6/1954 | Seaberg | 141—20 X |
| 3,074,426 | 1/1963 | Billington | 137—505.25 |

FOREIGN PATENTS

| | | |
|---|---|---|
| 821,696 | 10/1959 | Great Britain. |
| 869,098 | 5/1961 | Great Britain. |
| 351,469 | 2/1961 | Switzerland. |

LAVERNE D. GEIGER, *Primary Examiner.*

SAMUEL ROTHBERG, *Examiner.*

H. S. BELL, *Assistant Examiner.*